Patented Sept. 21, 1943

2,330,050

UNITED STATES PATENT OFFICE 2,330,050

PAINT PIGMENT COMPOSITION

Raymond L. Hallows and Vernon C. Walker, Joplin, Mo., assignors to The Eagle-Picher Lead Company, Cincinnati, Ohio, a corporation of Ohio No Drawing. Application August 23, 1940, Serial No. 353,976

2 Claims. (Cl. 106—296)

Our invention relates to a paint pigment composition and a process of making the same by a new and novel process of treating zinc oxide containing water soluble sulphur compounds with lead oxide or lead hydroxides as such, or in chemical combination, as for example, basic lead sulphate, basic lead carbonate or basic lead silicate.

Most zinc oxides made by direct processes, that is those made directly from zinc minerals or from roasted zinc minerals, contain appreciable amounts of water soluble sulphur compounds such as, zinc sulphate and zinc sulphite. Attempts have been made in the past to eliminate or to reduce the amount of water soluble sulphur compounds because it is believed their presence impairs the life of a paint film.

We have found that water soluble sulphur compounds in zinc oxide can be eliminated or be reduced to a very small amount by causing such compounds to react with lead oxide or lead hydroxide in chemical combination such as, for example, basic lead sulphate or basic lead carbonate. When basic lead sulphate is mixed with zinc oxide either by simple blending or by cofuming methods, the desired reaction to eliminate or reduce water soluble sulphur compounds is not brought about.

We have, however, found that the desired reaction can be brought about through the addition of water to the zinc oxide containing water soluble compounds together with lead oxide or lead hydroxide, as such, or in chemical combination, whereby lead sulphate and zinc oxide or zinc hydroxide are formed:

PbO (as such or as basic lead sulphate, for example) +ZnSO$_4$ (in the presence of water) =PbSO$_4$+ZnO Our invention is especially applicable to the reduction of water soluble sulphur compounds in leaded zinc oxides since they already contain the necessary lead oxide usually in chemical combination with lead sulphate. Our invention can be utilized with any grade of leaded zinc oxide containing water soluble sulphur compounds provided that the amount of such water soluble compounds is not in excess of the available lead oxide equivalent. In case there is not sufficient lead oxide naturally present in the leaded zinc oxide, additional lead oxide, preferably as free lead oxide, should be added. As an example of the practice of our invention we may select 50% leaded zinc oxide in which the water soluble zinc sulphate content is approximately 5% of the whole. To this we add water and mix so that all particles are thoroughly wetted. This mass is then dried or flushed by any well known process and the product substantially freed of water soluble sulphur compounds is then ready for use.

The superior quality of leaded zinc oxide treated by our process over the untreated type which contains zinc sulphate is readily demonstrated by accelerated exposure tests. In a particular case, 50 parts of basic lead sulphate and 50 parts of zinc oxide with a zinc sulphate content of 9.1% were blended. A part of the blend was wetted with water and after drying made into a paint while the remaining part was made into a paint without the addition of water. When placed on panels and exposed under identical accelerated conditions it was found that the gloss, color, chalking and integrity of the paint made from the treated pigment was superior to the untreated type. Whereas many large cracks or virtually complete failure occurred in the untreated paints almost perfect integrity of film was maintained for the treated paint.

Having thus disclosed our invention what we claim as new and desire to secure by Letters Patent is:

1. The process of purifying zinc oxide containing water soluble acid-reacting sulphur compounds which comprises reacting in aqueous medium a lead compound chosen from the group consisting of lead oxide, lead hydroxide, basic lead carbonate, basic lead sulphate and basic lead silicate with the sulphur compounds in the zinc oxide, and then drying the resultant product without calcination.

2. The process of purifying zinc oxide containing water soluble acid-reacting sulphur compounds, the latter including zinc sulphate and zinc sulphite, which comprises reacting said compounds in aqueous medium with lead oxide, and then drying the resultant product without calcination.

RAYMOND L. HALLOWS.
VERNON C. WALKER.